(12) United States Patent
Ritter et al.

(10) Patent No.: US 8,785,335 B2
(45) Date of Patent: Jul. 22, 2014

(54) FLUOROPHOSPHATE GLASSES

(75) Inventors: Simone Ritter, Mainz (DE); Bianca Schreder, Sulzbach (DE); Ute Woelfel, Mainz-Laubenheim (DE); Stefanie Hansen, Gensingen (DE)

(73) Assignee: Schott AG, Mainz (DE)

( * ) Notice: Subject to any disclaimer, the term of this patent is extended or adjusted under 35 U.S.C. 154(b) by 161 days.

(21) Appl. No.: 13/334,571

(22) Filed: Dec. 22, 2011

(65) Prior Publication Data

US 2012/0165178 A1   Jun. 28, 2012

(30) Foreign Application Priority Data

Dec. 23, 2010  (DE) .......................... 10 2010 064 148

(51) Int. Cl.
*C03C 3/23*   (2006.01)
*C03C 3/247*  (2006.01)
*C03C 3/16*   (2006.01)

(52) U.S. Cl.
USPC ................................ 501/44; 501/43; 501/45

(58) Field of Classification Search
USPC .............................. 501/40, 41, 44, 45, 47, 48
See application file for complete search history.

(56) References Cited

U.S. PATENT DOCUMENTS

| | | | | |
|---|---|---|---|---|
| 4,303,298 | A * | 12/1981 | Yamashita | 252/587 |
| 7,010,940 | B2 * | 3/2006 | Ogino et al. | 65/135.9 |
| 7,595,272 | B2 * | 9/2009 | Ikenishi et al. | 501/48 |
| 2004/0082460 | A1 | 4/2004 | Yamane et al. | |
| 2007/0051930 | A1 * | 3/2007 | Hachitani | 252/587 |

* cited by examiner

*Primary Examiner* — Noah Wiese
(74) *Attorney, Agent, or Firm* — Ohlandt, Greeley, Ruggiero & Perle, LLP (57) ABSTRACT

Glass having an optimized degree of cross-linking of the phosphate component in the glass matrix is provided so that excellent weatherability is achieved. These glasses are fluorophosphate glasses that contain copper oxide as coloring component. The glasses can further contain coloring components and are obtainable in a method that includes a bubbling step.

11 Claims, 2 Drawing Sheets

FLUOROPHOSPHATE GLASSES

CROSS REFERENCE TO RELATED APPLICATIONS

This application claims benefit under 35 U.S.C. §119(a) of German Patent Application No. 10 2010 064 148.0-45, filed Dec. 23, 2010, the entire contents of which are incorporated herein by reference.

BACKGROUND OF THE INVENTION

1. Field of the Invention

The present invention relates to fluorophosphate glasses which are colorized blue for the use as filter glasses.

2. Description of Related Art

Basically, fluorophosphate glasses for use as filter glasses are known in prior art. But these glasses have the disadvantage that their weathering resistance is poor and that their production is difficult due to their often very high content of fluorine, since fluorine itself and the fluorides of many glass components are volatile under the conditions of common production methods. Therefore, a lot of efforts have been made to optimize the compositions of fluorophosphate glasses with the target of obtaining glasses which on the one hand have good stability and on the other hand can be obtained through economic production methods. Furthermore, the glasses according to the present invention have a very steep absorption edge. This means that the above-mentioned range of high transparency in a range of 338 to 640 nm steeply passes into a range of low transparency. With other words, the transmission curve has in wave length ranges which are adjacent to the range of high transparency a high (positive or negative) slope. So it is achieved that color aberrations are reduced.

Thus it is the object of the present invention to provide fluorophosphate glasses which solve the problems of prior art.

BRIEF SUMMARY OF THE INVENTION

The glasses according to the present invention are so-called optical band-pass filters, thus filters with a wave length range of high transmission which is small to a greater or lesser extent (transmission range) surrounded by two filter attenuation bands. Such glasses are used in optical glass filters for example as color correction filters in color video cameras and digital cameras. Besides the high level of transparency between 350 and 650 nanometers (nm), typically the glasses according to the present invention have a steep edge in the adjacent UV and a very low transmission above 700 nm. While the UV range should be blocked as completely as possible, for example to avoid damages of sensitive electronic assemblies by energy-rich radiation, the intensity of the incident radiation should be attenuated in the range of higher than 700 nm so that for example in the case of a use in cameras the red cast of the picture caused by CCD is compensated.

Glasses having the following composition in % by weight are provided:

| % by weight | Minumum | Maximum |
|---|---|---|
| $P_2O_5$ | 25 | 60 |
| $Al_2O_3$ | 1 | 13 |
| MgO | 1 | 10 |
| CaO | 1 | 16 |
| BaO | 1 | 26 |
| SrO | 0 | 16 |
| ZnO | 0 | 10 |
| $Li_2O$ | 0 | 13 |
| $Na_2O$ | 0 | 10 |
| $K_2O$ | 0 | 11 |
| CuO | 1 | 7 |
| $\Sigma RO$ (R = Mg, Ca, Sr, Ba) | 15 | 40 |
| $\Sigma R_2O$ (R = Li, Na, K) | 3 | 18 | wherein the mass ratio of copper oxide (CuO) to phosphate ($P_2O_5$) preferably has a value of 0.1 to 0.21 and wherein in the glass, based on the mentioned composition, up to 39% by mol of the oxide ions ($O^{2-}$) are replaced with fluoride ions ($F^-$).

DETAILED DESCRIPTION OF THE INVENTION

For the human eye the glasses according to the present invention appear to have blue, blue-green, turquoise or cyan color and are used as IR cut filters. In this case the colors are negligible. Rather the filter characteristic with the absorption in the UV to approximately 320 nm and in the near IR at approximately 850 nm by the addition of the colorizing oxide CuO is decisive for the use as a filter in front of the sensor of digital cameras. In this case, the blocking of UV light is achieved by the base glass itself as well as $Cu_2O$ and may be increased by the addition of $CeO_2$.

The cross-link degree of phosphate glasses describes the extent of cross-linking of the phosphorus atoms in the glass. In this case each $P^{5+}$ can be cross-linked with at most three oxygen atoms which again can form bonds to the next phosphorus atom with a further valence, thus are contributing to the network. The fourth oxygen atom in the $PO_4$ tetrahedron forms a double bond to the phosphorus atom due to the covalence of 5 of the phosphorus atom, so that this oxygen atom cannot form bonds with other partners and thus is not contributing to the network. In a network in which each phosphorus atom is in the oxidation state 5+ and is bonded to three oxygen atoms which are capable of forming bonds with other bonding partners the cross-link degree is 100%. A person skilled in that art will know these facts.

According to the present invention is was shown that it is particularly advantageous to adjust the cross-link degree of the glasses to a value of at least 65% and preferably at most 99%, further preferably at most 95% and particularly preferably at most 90%. This is achieved on the one hand by the selection of suitable components, but on the other hand also by the possible bubbling of oxygen, preferably oxygen having a level of purity of higher than 99%, through the glass melt. This step of bubbling allows the adjustment of the redox ratio of the glass components in favor of higher valence states which i.a. has a favorable influence onto the filter characteristic. A side effect of the bubbling is the stripping off of a proportion of fluorine of the glass. In this case exact process conditions have to be fulfilled, since otherwise this process may result in a glass having a cross-link degree which is too high.

On the one hand fluorine is necessary for the adjustment of the filter characteristic (transmission) and on the other hand it reduces the stability of the glass depending on the concentration range. But proportions of fluoride ions in phosphate glasses also have network forming character.

The glass according to the present invention may in particularly be prepared by a method in which a step of bubbling oxygen through the melt is conducted for a period of time of 10 to 40 minutes, preferably 10 to 30 minutes. This step of bubbling should be conducted at temperatures of above 900 degrees Celsius (° C.), preferably even above 925° C. and further preferably above 1000° C., wherein a temperature of 1200° C. is preferably not exceeded, and in particular preferable embodiments a temperature of at most 1100° C. is not exceeded. In this case, preferably the value of the flow rate of the oxygen is at least 40 liters per hour (L/h), further preferably at least 50 L/h and further preferably at most 80 L/h and further preferably at most 70 L/h. When these parameters are fulfilled, then a glass according to the present invention is obtained, when the below-mentioned composition ranges are met. The production method described herein is also a part of this invention as well as the glass which can be prepared therewith.

Further preferably, the glasses according to the present invention have a cross-link degree of at least 68%, since the cross-linking mainly happens via $PO_4$ tetrahedrons and the fourth oxygen is not available for the cross-linking due to the double bond to the phosphorus atom. Further preferable are cross-link degrees of at least 72%. This cross-link degree is possible with the glasses according to the present invention, when sufficient $Al_2O_3$ mediated by a proportion of alkalis which is sufficiently high enough according to the present invention rather acts as a network former than as a network modifier. Therefore, the molar ratio of $R_2O$ to $Al_2O_3$ in the glasses according to the present invention is preferably >1, preferably >1.5. Therefore, the cross-link degree is in particularly achieved by the compliance with the below-mentioned limits and ratios with respect to the components $Al_2O_3$ and $P_2O_5$ and F. The high cross-link degree of the glass is necessary to realize the high stabilities, in particular the climate stability of the glass. Furthermore, the described production method provides a contribution to the cross-link degrees. But the cross-link degree must not be too low or too high, since otherwise the filter characteristic (transmission) is not achieved. Therefore, preferably the cross-link degree is at least 70% and in particular at most 88%.

The cross-link degree may be determined by $^{31}P$ NMR analyses, in particular by way of an MAS (magic angle spinning) analysis. A person skilled in the art knows this measuring method.

As already mentioned at the beginning of this specification, the glass according to the present invention is a blue filter glass. Therefore, it comprises copper oxide (CuO) in amounts of at least 1% by weight as a colorizing component. When copper oxide is used in amounts which are too low, then the colorizing effect is not sufficient for the purposes of this invention. But when on the other hand a content of copper oxide is chosen which is too high, then a negative influence on the transmission of the glass results. In particular, the content of copper oxide is at least 2% by weight, preferably at least 2.3% by weight and particularly preferably at least 3% by weight.

In one embodiment of this invention the content of copper oxide in the glass is 1% by weight to <3% by weight, preferably 2 to <3% by weight. When such a low content of copper is chosen, then in the glasses a broad pass range with high transmission can be achieved.

In another embodiment the content of copper oxide is at least 3% by weight and at most 7% by weight, preferably even at most 5% by weight. So an absorption edge in the IR cut range which is still steeper and a higher absorption at about 850 nm are achieved.

In a special embodiment, the glass of this invention comprises 1 to <3% by weight or 3 to 7% by weight of copper oxide.

It was shown that it is particularly advantageous to adjust the mass ratio of copper oxide to phosphate such that a value of at most 0.21, in particular at most 0.15 is achieved. Preferably, this value should not fall below at least 0.04, in particularly 0.05 and particularly preferably 0.09. The present inventors have found that in particular the mass ratio of copper oxide to phosphate has a decisive influence onto the obtained color quality. Therefore, the used amounts should be used such that the described mass ratio can be achieved. Preferably, the value of the described mass ratio should not fall below the lower limit of $CuO/P_2O_5$ of 0.1 and in particularly 0.06. In preferable embodiments this ratio is at most 0.18 and further preferable at most 0.14. So primarily, the ratio of the colorizing oxide to the main glass former in the glass according to the present invention is important.

Based on this knowledge it was shown that it is particularly advantageous for the choice of a suitable amount of color oxide also to take the additional glass former aluminium oxide ($Al_2O_3$) into consideration. In this case it was shown that a mass ratio of $CuO/Al_2O_3$ of 0.5 to 2.2 is a preferable range, wherein ranges of 0.5 to 1 (preferably to 0.8) and of 1.1 (preferably 1.8) to 2.2 have also be shown to be advantageous. Particularly preferable, this mass ratio is at least 0.8 and particularly preferably at least 0.9. Particularly preferable, this ratio is at most 1.2.

Preferably, the glass according to the present invention has at least on one side at least one coating. In this case, preferably this is an antireflection (AR) and/or UV/IR cut coating. These layers reduce reflections and increase the transmission and/or increase the IR blocking and increase the slope of the absorption edge at about 650 nm. These layers are interference layers.

In the case of an antireflection layer the glass carries on at least one side 4 to 10 layers of this kind, and in the case of a cut coating even preferably there are 50 to 70 layers. Preferably, these layers consist of hard metal oxides such as in particular $SiO_2$, $Ta_2O_3$, $TiO_2$ or $Al_2O_3$. Preferably, these layers are applied on different sides of the filter glass. In addition, such coatings further increase the weathering resistance/climate stability.

The glass according to this invention comprises at least one alkali metal oxide. Alkali metal oxides facilitate the processing of the glass by their action as a fluxing agent in the melt, thus by reducing the viscosity of the glass and lowering the glass transition temperature. But amounts of these oxides which are too high affect the stability of the glasses and increase the coefficient of expansion of the glass. When the coefficient of expansion is too high, then the step of cold post-processing of the glass cannot be conducted in an optimal manner. Furthermore, the heat resistance and the ability to stress relief of the glass are reduced in the annealing oven.

Therefore, preferably the content of alkali metal oxides should not fall below the value of 3% by weight. In preferable embodiments this content does not fall below a value of 4% by weight, further preferably 8% by weight and most preferably 10% by weight. The content of these oxides should not exceed a value of 18% by weight, preferably 15% by weight and most preferably 14.5% by weight, so that the stability of the glasses is not endangered. According to the present invention, preferably lithium oxide ($Li_2O$), potassium oxide ($K_2O$) and sodium oxide ($Na_2O$) are used.

Preferably, glasses according to the present invention contain at least two members of the group of the alkali oxides lithium oxide, potassium oxide and sodium oxide. In this case it was shown that it is advantageous to combine the alkali metal oxides lithium oxide and potassium oxide or potassium oxide and sodium oxide, since these combinations have a stabilizing effect in the sense of a mixed alkali effect on the glass.

In preferable embodiments the glasses according to the present invention comprise potassium oxide in amounts of at least 0.01% by weight and preferably at least 4% by weight, further preferably at least 5% by weight. But the content of potassium oxide should not exceed a value of 11% by weight, preferably 10% by weight, further preferably 9% by weight, particularly preferably 8% by weight. Otherwise, the chemical stability of the glass would be affected too much.

The glass according to the present invention preferably comprises lithium oxide in amounts of at least 1.5% by weight, further preferably at least 2% by weight. But preferably, the content of this component should not be higher than 13% by weight, since its tendency to evaporation is high, in particular when it is used together with higher amounts of fluoride. Therefore, in preferable embodiments its proportion is only up to 10% by weight, further preferably up to 7% by weight, in particularly at most 6% by weight, but most preferably up to 5% by weight. Certain embodiments are free of lithium oxide.

By the way, the glasses according to the present invention also preferably comprise sodium oxide in amounts of at least 2% by weight, preferably at least 3.5% by weight and further preferably at least 4% by weight. With this component the devitrification stability can be improved. If this component is used in an amount which is too low, then this effect is not achieved. In this case, a content of at most 10% by weight, further preferably 8% by weight and particularly preferably 7% by weight should not be exceeded due to stability reasons.

According to the present invention the glasses also comprise alkaline-earth oxides. Alkaline-earth oxides are used for adjusting the viscosity. They have the same function as the alkali oxides as network modifiers. Their content should not exceed a value of 40% by weight. Preferable, the alkaline-earth oxides of the present invention are magnesium oxide (MgO), calcium oxide (CaO), barium oxide (BaO) and strontium oxide (SrO).

The content of the alkaline-earth oxides should not be lower than 15% by weight, so that viscosities can be adjusted which are still production-friendly. In preferable embodiments the content of alkaline-earth oxides is at most 37.5% by weight, further preferably at most 35.5% by weight. Preferably, the lowest value of the content should not fall below 17% by weight, further preferably 18% by weight.

Particular embodiments of the glasses according to the present invention comprise phosphate in amounts of higher than 45% by weight. In these embodiments the content of alkaline-earth oxides should be at least 16% by weight and further preferably at least 19% by weight and particularly preferably at least 20% by weight or at least 20.5% by weight. In other embodiments which comprise phosphate in amounts of lower than 40% by weight the content of alkaline-earth oxides should be at least 25% by weight and further preferably 26% by weight and at most 40% by weight, preferably at most 38% by weight and further preferably 37% by weight.

It was shown that it is advantageous to choose the alkaline-earth oxides in the glass according to the present invention such that the mass proportion of barium oxide is higher than the mass proportion of strontium oxide. According to the present invention it is particularly preferable, when the sum of the mass proportions of barium oxide and calcium oxide is at least 12% by weight. So the stability of the glasses is further improved. In this case it is preferred that the mass proportions of barium oxide and calcium oxide together are higher by a factor of at least 1.3 and further preferable at least 2.0 than the sum of the mass proportions of magnesium oxide and strontium oxide.

Preferably, the glasses according to the present invention comprise at least three, but most preferably all of the above-mentioned alkaline-earth oxides. In this case the content of magnesium oxide, calcium oxide and barium oxide should be at least 1% by weight each; the content of strontium oxide is preferably at least 0.01% by weight. In preferable embodiments the minimum content of barium oxide is at least 3% by weight, further preferably at least 9% by weight and particularly preferably at least 11.5% by weight. An upper limit of 26% by weight should not be exceeded; in preferable embodiments an upper limit of 16% by weight is not exceeded and in particularly preferable embodiments the maximum content of barium oxide is at most 5% by weight.

Preferably, the content of magnesium oxide is at least 1% by weight, further preferably at least 4% by weight and particularly preferably at least 5% by weight. Preferably, the maximum content of this component is at most 10% by weight, more preferably at most 9% by weight, further preferably at most 8% by weight and most preferably at most 7% by weight. Preferably, the content of calcium oxide is at least 1% by weight and preferably at most 16% by weight, more preferably at most 14% by weight, further preferably at most 12% by weight.

Preferably, the content of strontium oxide should be at least 0.01% by weight, further preferably at most 16% by weight, more preferably at most 15% by weight and most preferably at most 13% by weight.

Zinc oxide is used for decreasing the coefficient of expansion and thus increases the heat resistance and the ability to stress relief of the glass in the annealing oven. According to the present invention zinc oxide may be omitted due to the special composition of the glasses of this invention. But if it is used, its content should be at most 10% by weight; in particular embodiments the content is at most 5% by weight. In particular embodiments the glass of this invention is free of zinc oxide.

Boron oxide tends to evaporation like fluorine so that the content of boron oxide has to be very low. According to the present invention the content of boron oxide is at most 1% by weight. It is particularly preferable that the content of boron oxide is lower than 0.5% by weight and it is especially preferable that the glass according to the present invention is free of boron oxide.

As a glass former with the content of phosphate ($P_2O_5$) in the glasses according to the present invention being at least 25% by weight this content is relatively high. Here the upper limit of the content of phosphate is 60% by weight, preferably 57% by weight. In preferable embodiments the glasses of this invention comprise at most 42% by weight of phosphate. Particular embodiments comprise at least 43% by weight and at most 60% by weight, preferably at most 57% by weight of phosphate. Other glasses according to the present invention comprise more than 57% by weight to at most 60% by weight of phosphate.

In the glasses according to the present invention aluminium oxide ($Al_2O_3$) is contained in proportions of 1 to 13% by weight. In preferable embodiments the glasses comprise at least 2% by weight of aluminium oxide. It is particularly preferable that the content of aluminium oxide is at most 12% by weight, further preferable at most 11% by weight, most preferable at most 10% by weight. In particular embodiments the content of aluminium oxide is up to 6% by weight.

As a fining agent preferably arsenic oxide and/or antimony oxide may be added to the glasses. The proportion of these components should not exceed 0.5% by weight. The fining process of this glass is preferably conducted via physical fining, i.e. the glass is highly liquid at the melting/fining temperatures so that the bubbles can rise. The addition of $As_2O_3$ and/or $Sb_2O_3$ promotes the discharge and/or the input of oxygen in the melt. Furthermore, the polyvalent oxides may influence the redox behavior and thus may promote the formation of Cu(II)O. Nevertheless, these oxides are toxic and are not implicitly accepted any longer by the customer. Therefore, preferable embodiments of the glasses are free of arsenic and antimony.

Particular embodiments of this invention also comprise cerium oxide ($CeO_2$) in amounts of up to 1% by weight, preferably up to 0.8% by weight, further preferably up to 0.6% by weight. Preferable embodiments are free of cerium oxide. Cerium oxide increases the resistance of the glass against UV radiation by absorbing in the UV range. The addition of this component should be avoided, because it shifts the UV edge to the range of longer wave lengths due to its UV absorption and thus makes the pass range smaller. However, a large pass range is desired.

The proportion of glass formers, thus of phosphate and aluminium oxide together, should preferably be higher than 37.5% by weight to guarantee a sufficient stability in the glasses of this invention. Preferably, the sum of both components is at most 63% by weight, further preferably at most 62% by weight and particularly preferably at most 57.5% by weight. In a particular embodiment the proportion of these glass formers is >57.5% by weight and at most 63% by weight.

In this case it was shown that it is particularly advantageous to adjust the mass ratio of phosphate to aluminium oxide to a value of at least 3, further preferably at least 5 and particularly preferably at least 15. Preferably, this value should be at most 20. In further preferable embodiments this value is at most 19 and further preferably at most 18.7 and in particularly preferably 18.5.

Basically, here it does not depend on the mass ratio of these oxides, rather the ratio of the quantities of the respective cations (in mol) is important, since these glasses do not only comprise oxides as anions. So it is in particularly preferable that the molar quantity of the phosphorus cations ($P^{5+}$) is higher than the molar quantity of the aluminium cations ($Al^{3+}$). Preferably, the proportion of the molar quantity of phosphorus cations is higher than the proportion of the aluminium ions by a factor of at least 2.25. In particularly preferable embodiments the proportion of phosphorus is higher than the proportion of aluminium by a factor of at least 3.75. Further preferably, this ratio of the molar quantities (P/Al) is even at least 10 and more preferable at least 12.

When in this description the term "molar quantity" is mentioned, then this means the quantity of this substance in mol, thus the number of the respective ion, atom or molecule.

When the composition of the glass formers phosphate and aluminium oxide as described herein is fulfilled, then excellent cross-link degrees can be achieved. So the adjustment of the color of the glasses can be conducted via the proportion of F in a more flexible way. At the same time an excellent stability is provided and economic processability is guaranteed, despite the high proportion of fluoride. However in this case it should be considered that the molar quantity of phosphorus with respect to the total molar quantity of cations preferably should not fall under a value of 30%, since otherwise often the required stability cannot be achieved.

In those embodiments in which the content of phosphate is higher than 45% by weight, the mass ratio of phosphate to aluminium oxide preferably is a value of at least 15 and preferably at most 20. In those embodiments in which the amount of phosphate is lower than 40% by weight, this value is at least 3 and preferably at most 6.

Partially, the oxides have to be replaced with fluorides so that the transmission of the glasses which is required for the use as IR cut filters is achieved. But with the addition of fluoride ions there exists the risk that during the production method fluorine escapes from the mixture. Therefore, the amount of oxides which are replaced with fluorides must not be too high. According to the present invention it is preferable that at most 35% of the quantity of the oxide ions are replaced with fluoride ions. Particularly preferably, at most 23% and further preferably at most 20% of the quantity of the oxide ions are replaced with fluorides. Preferably at least 4%, further preferably at least 5%, particularly preferably at least 6% and in particularly at least 7% of the quantity of the oxide ions have to be replaced with fluoride ions, so that the advantages of such an addition of fluoride show an effect.

In such glasses which have proportions of phosphate of higher than 45% by weight, preferably up to 12% by weight of the oxide ions are replaced with fluoride ions; further preferably they are up to 10% by weight, particularly preferably up to 8% by weight. In such glasses which comprise amounts of phosphate of lower than 40% by weight, preferably at least 9% by weight and particularly preferably at least 12% by weight of the oxide ions are replaced with fluorides.

Due to the above-mentioned relationships fluoride ions and oxygen ions are a mixture of anions, the composition of which has a great influence on the stability of the glasses according to the present invention. In particular it is preferred according to the present invention that the proportion of the quantity of the fluoride in this mixture does not exceed a value of 37%. In particularly preferable embodiments this proportion is simply lower than 25%, further preferably even lower than 20% and most preferably lower than 17%.

Preferably, the glasses according to the present invention are free of vanadium oxide ($V_2O_5$), since this oxide may have a negative influence on the transmission properties of the glasses. For the same reason, preferably the glasses are free of iron oxide ($Fe_2O_3$); but if alternative embodiments nevertheless contain iron oxide, then its content is limited to at most 0.25% by weight. $Fe_2O_3$ may be added to the glass as an impurity of other components. In preferable embodiments the glasses according to the present invention besides copper oxide do not comprise further colorizing oxides.

Preferable embodiments are free of rare earths ions such as yttrium, lanthanum, gadolinium and ytterbium. In particular, the glass is free of yttrium. Preferable, the glass herein described is free of components which are not mentioned herein as a glass constituent.

When it is mentioned in this description that the glasses are free of one component or do not contain a special component, then this means that this component can only be present in the glasses as an impurity. This means that it is not added in substantial amounts. According to the present invention, not substantial amounts are amounts of lower than 100 ppm, preferably lower than 50 ppm and most preferably lower than 10 ppm. In case of doubt, the unit "ppm" is based on masses.

Preferably, a certain ratio of the molar quantities of oxygen to phosphorus should be present in the glasses so that the increased weathering resistance of the glasses which is desired according to the present invention can be achieved. Preferably, according to the present invention this ratio of molar quantities is at least 2.3. Further preferably, this ratio of molar quantities is at most 4 and further preferably at most 3.7. When this ratio of molar quantities—in connection with the concept of the filter glasses according to the present invention—is accordingly adjusted, then in the glass a cross-link degree according to the present invention can be achieved.

Preferably, the glasses of this invention are free of lead and cadmium as well as radioactive constituents.

Preferably, the cationic constituents of the glasses of this invention consist of at least 90% by molar quantity, preferably 95% by molar quantity and most preferably 97.5% by molar quantity of cations that are selected from the group consisting of phosphorus, aluminium, magnesium, calcium, strontium, barium, lithium, sodium, potassium and copper.

In a particularly preferable embodiment the compositions of the glasses are within the following ranges in % by weight:

| % by weight | Minimum | Maximum |
| --- | --- | --- |
| $P_2O_5$ | 25 | 42 |
| $Al_2O_3$ | 3 | 12 |
| MgO | 1 | 6 |
| CaO | 1 | 11 |
| BaO | 9 | 26 |
| SrO | 0 | 16 |
| $Li_2O$ | 2 | 10 |
| $Na_2O$ | 0 | 7 |
| $K_2O$ | 0 | 11 |
| CuO | 1 | 7 |

In an alternative embodiment with a higher proportion of phosphate the glasses according to the present invention have the following composition in % by weight:

| % by weight | Minimum | Maximum |
| --- | --- | --- |
| $P_2O_5$ | 43 | 60 |
| $Al_2O_3$ | 1 | 6 |
| MgO | 3 | 10 |
| CaO | 3 | 16 |
| BaO | 1 | 16 |
| SrO | 0 | 2 |
| $Li_2O$ | 0 | 7 |
| $Na_2O$ | 2 | 10 |
| $K_2O$ | 2 | 11 |
| CuO | 1 | 7 |

Also the production method of the glasses according to the present invention is an important aspect of this invention. When the steps which are described below are conducted, the glasses having the preferred cross-link degree can be obtained.

For the production of the glasses according to the present invention as a raw material preferably complex phosphate is added to the mixture. The term "complex phosphate" means that to the mixture no phosphate in the form of "free" $P_2O_5$ is added, but other components such as $Na_2O$, $K_2O$, etc., not in oxidic form or as a carbonate but as a phosphate are added to the mixture, such as e.g. $Al(PO_3)_3$, $Ba(H_2PO_4)_2$, $Ca(H_2PO_4)_2$, $LiH_2PO_4$, $KPO_3$, $NaPO_3$.

This means that the phosphate is added as an anionic component of a salt, wherein the respective cationic component of this salt itself is a glass constituent. This provides the advantage that the proportion of complex phosphates increases with a decrease of the amount of free $P_2O_5$, which may result in good controllability of the melt behavior and clearly reduced evaporation and dust effects along with an improved inner quality.

In addition, an increased proportion of free phosphate is connected with requirements for the safety technique of the production plant which results in increased production costs. With the measure according to the present invention the processability of the glass composition is significantly improved: The tendency to evaporation and to the formation of dust of the mixture are lowered very strongly and clearly improved homogeneities of the glass melt are achieved which can be seen in particular in the quality and homogeneity of the optical data of the produced glass. But also a generally improved inner quality of the glass with respect to for example bubbles and/or streaks of the material with a high content of phosphate which otherwise often results in streaks due to its shortness is observable.

Preferably, the fluorine is introduced into the glass in the form of fluorides such as e.g. $AlF_3$, LiF, NaF, KF, $MgF_2$, $CaF_2$, $SrF_2$.

The alkali oxides and alkaline-earth oxides may also be introduced as carbonates.

The glass according to the present invention is molten from a uniform mixture with the respective composition which has been mixed well in advance in a discontinuous such as e.g. Pt crucible or continuous melt aggregate such as e.g. AZS ($Al_2O_3$—$ZrO_2$—$SiO_2$) tank, Pt tank or quartz glass tank at temperatures of preferably 930 to 1100° C., fined thereafter and homogenized.

During the step of melting the glass the components which are contained in the crucible or tank material can be incorporated into the glass. I.e. after a melting step in a quartz glass tank up to 2% by weight of $SiO_2$ may be contained in the glass, also in the case when they have not been added thereto explicitly.

The melt temperatures depend on the chosen composition. For the adjustment of the redox ratio in the melt, preferably through the glass a gas which contains oxygen (in particular oxygen) is bubbled. Preferably, the step of bubbling should last 10 to 40 minutes. Furthermore, this bubbling serves for homogenizing the melt. Besides its above-described effects the bubbling also facilitates the formation of the cross-link degree according to the present invention.

The step of fining the glass is preferably conducted at 950 to 1100° C. Generally, the temperatures should be low so that the evaporation of the components such as fluorine, $Li_2O$ and $P_2O_5$ which are volatile is as low as possible.

The use of the glasses according to the present invention as filter glasses, in particular IR cut glasses, is also according to the present invention. In addition, the use of these glasses for the protection of CCDs in cameras is also according to the present invention.

EXAMPLES

TABLE 1

Melting example for 100 kilograms (kg) of calculated glass (according to example 1)

| Oxide | % by weight | Raw material | Weighed portion (g) |
| --- | --- | --- | --- |
| $P_2O_5$ | 37.73 | $Al(PO_3)_3$, | 19875.61 |
| | | $Ba(H_2PO_4)_2$ | see BaO |
| $Al_2O_3$ | 6.92 | $AlF_3$ | 5923.06 |
| MgO | 3.04 | $MgF_2$ | 4698.24 |
| CaO | 2.07 | $CaCO_3$ | 3692.52 |
| BaO | 23.09 | $Ba(H_2PO_4)_2$ | 50959.86 |
| $Li_2O$ | 2.25 | $Li_2CO_3$ | 5601.93 |

TABLE 1-continued

Melting example for 100 kilograms (kg) of calculated glass (according to example 1)

| Oxide | % by weight | Raw material | Weighed portion (g) |
|---|---|---|---|
| $Na_2O$ | 3.74 | $Na_2CO_3$ | 6386.58 |
| $K_2O$ | 7.10 | KF | 8785.10 |
| F | 9.30 | $AlF_3$, $MgF_2$, KF | see $Al_2O_3$, MgO and $K_2O$ |
| CuO | 4.76 | CuO | 4804.58 |
| Sum | 100 | | 110727.5 |

For the production of 100 kg of a fluorophosphate filter glass with the composition of example 1 according to the synthesis in Table 1 a glass mixture is intensively mixed. This mixture is molten within a time of approximately 3 hours at 950° C. and oxygen is bubbled through it for approximately 30 minutes. Also the step of fining is conducted at 950° C. due to the low viscosity thereof. After leaving it unchanged for approximately 15 to 30 minutes, casting is conducted at a temperature of approximately 940° C.

Figure 1:
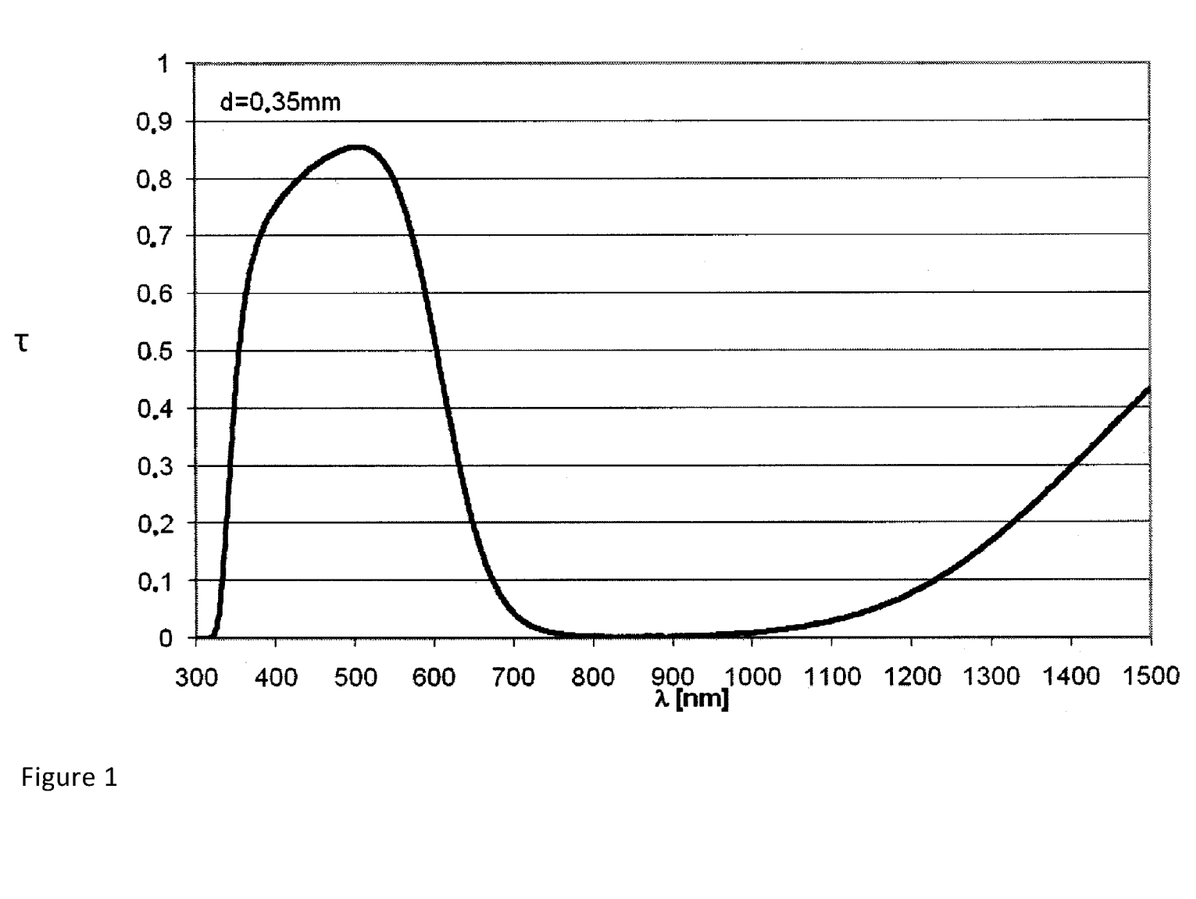
FIG. 1 shows the transmission spectrum of a glass according to an exemplary embodiment of the present disclosure.

FIG. 1 shows the transmission spectrum of a glass according to the present invention (example glass 1) and proves that these glasses have excellent filter properties. This transmission relates to a thickness of the sample of 0.35 mm. At the abscissa the transmission and at the ordinate the wave length is plotted.

Figure 2:
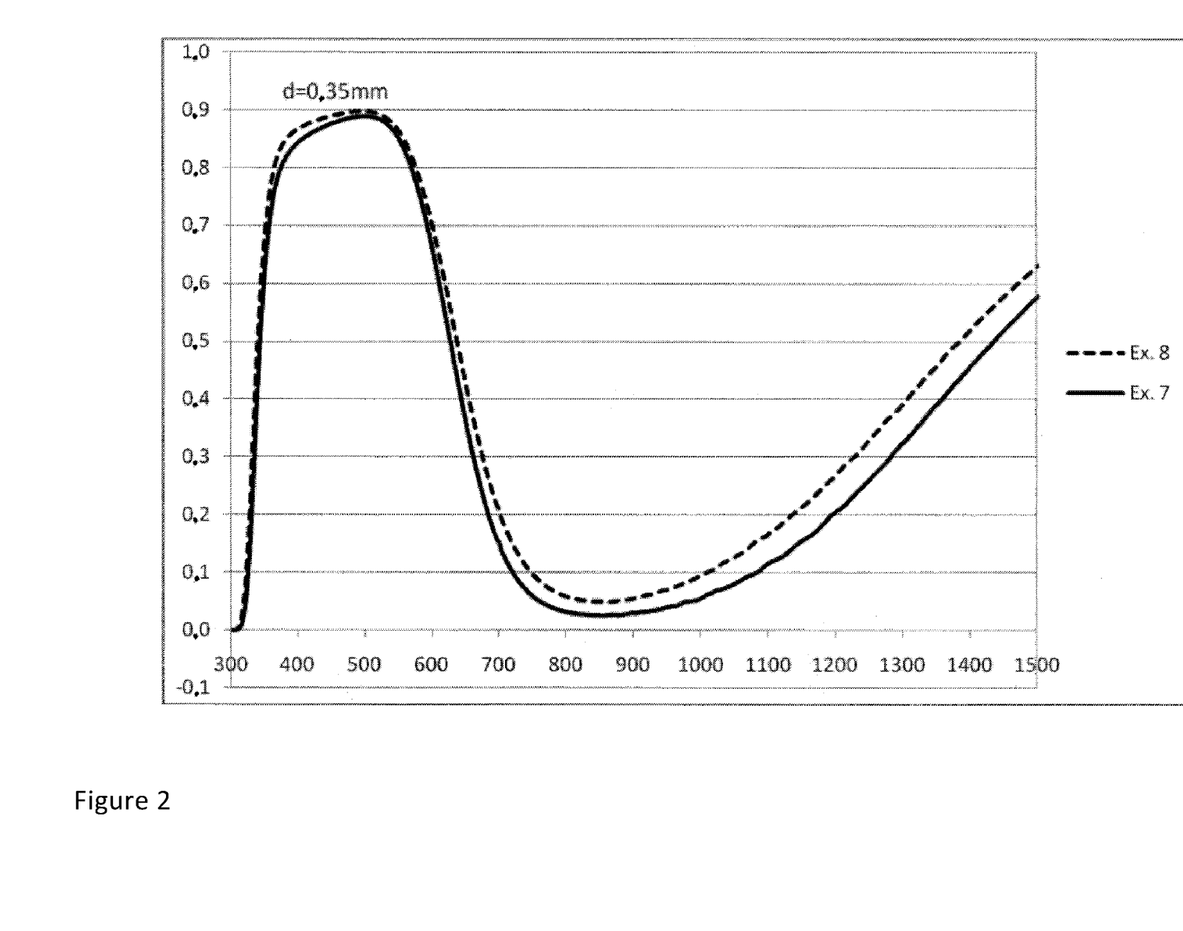
FIG. 2 shows the corresponding transmission spectra of glasses according to exemplary embodiments of the present disclosure.

FIG. 2 shows corresponding transmission spectra of the examples glasses 7 and 8. At the abscissa the transmission and at the ordinate the wave length is plotted. It can be seen that the glasses have a very broad pass range of high transmission in the wave length range of about 330 to 640 nm. Example glass 8 shows a plateau in the wave length range at about 400 nm with respect to transmission, whereas example glass 7 shows in this range a steep slope. The reason for that is the higher copper content in example glass 7.

In Table 2 can be seen that the wave length range of high transmission values ($\tau \geq 0.8$) is flanked with ranges of low transmission values (steep absorption edge). This is an essential advantage of the filter glasses of this invention.

The following table 2 shows further glass compositions of this invention (in % by weight):

| Glass No. | 1 | 2 | 3 | 4 | 5 |
|---|---|---|---|---|---|
| $P_2O_5$ | 38.79 | 30.37 | 47.24 | 53.48 | 56.42 |
| $Al_2O_3$ | 7.03 | 9.11 | 2.60 | 2.95 | 3.17 |
| $B_2O_3$ | 0 | 0.05 | 0 | 0.05 | 0.05 |
| MgO | 2.92 | 2.31 | 6.35 | 5.99 | 6.65 |
| CaO | 2.05 | 7.65 | 6.46 | 11.75 | 10.66 |
| SrO | 0.03 | 12.60 | 0.03 | 0.01 | 0.01 |
| BaO | 22.94 | 12.62 | 13.70 | 3.05 | 3.19 |
| $Li_2O$ | 2.32 | 4.51 | 1.97 | 0 | 0 |
| $Na_2O$ | 4.09 | 0 | 6.35 | 5.27 | 5.45 |
| $K_2O$ | 7.78 | 0 | 5.32 | 7.76 | 8.00 |
| $As_2O_3$ | 0.03 | 0.02 | 0.03 | 0.03 | 0.03 |
| $Sb_2O_3$ | 0.01 | 0.01 | 0.01 | 0.01 | 0.01 |
| $CeO_2$ | 0 | 0.23 | 0 | 0 | 0 |
| CuO | 4.78 | 5.22 | 5.53 | 5.74 | 3.06 |
| $F/F_2$ | 7.24 | 15.29 | 4.42 | 3.91 | 3.31 |
| Sum | 100 | 100 | 100 | 100 | 100 |
| $P_2O_5 + Al_2O_3$ | 45.81 | 39.47 | 49.83 | 56.43 | 59.59 |
| $P_2O_5/Al_2O_3$ | 5.5 | 3.3 | 18.2 | 18.1 | 17.8 |
| $CuO/P_2O_5$ | 0.12 | 0.17 | 0.12 | 0.11 | 0.05 |
| $CuO/Al_2O_3$ | 0.68 | 0.57 | 2.13 | 1.95 | 0.96 |
| Properties | | | | | |
| Cross-link degree | 84.7% | 79.1% | 90.1% | 90.0% | 92.4% |
| $\alpha_{(20,300° C.)} [10^{-6}/K]$ | 15.42 | 14.27 | 15.00 | 13.66 | na |
| Tg [° C.] | 366 | 364 | 365 | 405 | na |
| $\rho [g/cm^3]$ | 3.2578 | 3.4204 | 3.0768 | 2.8805 | na |
| $\tau(d = 0.35\ mm) >= 0.5$ [nm] | 361 | na | 360 | 355 | 341 |
| $\tau(d = 0.35\ mm) >= 0.8$ [nm] | 435 to 545 | na | 460 to 553 | 433 to 551 | 368 to 572 |
| $\tau(d = 0.35\ mm) <= 0.5$ [nm] | 599 | na | 610 | 604 | 632 |

| Glass No. | 6 | 7 | 8 | 9 | 10 |
|---|---|---|---|---|---|
| $P_2O_5$ | 55.89 | 55.52 | 56.40 | 57.00 | 56.80 |
| $Al_2O_3$ | 3.13 | 3.08 | 3.15 | 3.20 | 3.16 |
| $B_2O_3$ | 0.05 | 0.05 | 0.05 | 0.05 | 0.05 |
| MgO | 6.64 | 6.50 | 6.72 | 6.75 | 6.63 |
| CaO | 10.50 | 10.92 | 10.87 | 10.68 | 10.58 |
| SrO | 0.012 | 0.012 | 0.012 | 0.029 | 0.03 |
| BaO | 3.15 | 3.21 | 3.22 | 3.21 | 3.15 |
| $Li_2O$ | 0 | 0 | 0.0 | 0 | 0 |
| $Na_2O$ | 5.37 | 5.28 | 5.45 | 5.91 | 5.81 |
| $K_2O$ | 7.88 | 7.87 | 7.94 | 7.95 | 7.89 |
| $As_2O_3$ | 0.026 | 0.026 | 0.026 | 0.025 | 0.025 |
| $Sb_2O_3$ | 0.01 | 0.01 | 0.012 | 0.011 | 0.011 |
| $CeO_2$ | 0 | 0 | 0 | 0 | 0 |

| | | | | | |
|---|---|---|---|---|---|
| CuO | 3.42 | 3.45 | 2.84 | 2.78 | 2.76 |
| $F/F_2$ | 3.92 | 4.07 | 3.33 | 2.40 | 3.13 |
| Sum | 100 | 100 | 100 | 100 | 100 |
| $P_2O_5 + Al_2O_3$ | 59.02 | 58.60 | 59.56 | 60.20 | 59.95 |
| $P_2O_5/Al_2O_3$ | 17.9 | 18.0 | 17.9 | 17.8 | 18.0 |
| $CuO/P_2O_5$ | 0.06 | 0.06 | 0.05 | 0.05 | 0.05 |
| $CuO/Al_2O_3$ | 1.09 | 1.12 | 0.90 | 0.87 | 0.87 |
| Properties | | | | | |
| Cross-link degree | 92.39% | 92.87% | na | 93.55% | na |
| $\alpha_{(20,300°\,C.)}\,[10^{-6}/K]$ | 13.87 | 13.92 | 13.69 | na | na |
| Tg [° C.] | 395 | 393 | 408 | na | na |
| $\rho\,[g/cm^3]$ | 2.8240 | 2.8237 | 2.8157 | na | na |
| $\tau(d = 0.35\ mm) >= 0.5$ [nm] | 343 | 342 | from 339 | 341 | 341 |
| $\tau(d = 0.35\ mm) >= 0.8$ [nm] | 374 to 568 | 376 to 568 | 364 to 578 | 362 to 574 | 364 to 576 |
| $\tau(d = 0.35\ mm) <= 0.5$ [nm] | 628 | 630 | from 638 | 634 | 635 |

| Glass No. | 11 | 12 | 13 | 14 |
|---|---|---|---|---|
| $P_2O_5$ | 56.61 | 55.90 | 56.16 | 56.18 |
| $Al_2O_3$ | 3.11 | 3.04 | 3.04 | 3.03 |
| $B_2O_3$ | 0.05 | 0.05 | 0.05 | 0.05 |
| MgO | 6.389 | 6.425 | 6.48 | 6.45 |
| CaO | 11.015 | 11.238 | 11.13 | 11.15 |
| SrO | 0 | 0 | 0 | 0 |
| BaO | 3.282 | 3.291 | 3.34 | 3.34 |
| $Li_2O$ | 0 | 0 | 0 | 0 |
| $Na_2O$ | 5.23 | 5.29 | 5.32 | 5.27 |
| $K_2O$ | 7.98 | 7.89 | 7.83 | 7.86 |
| $As_2O_3$ | 0.026 | 0.026 | 0.026 | 0.026 |
| $Sb_2O_3$ | 0.012 | 0.012 | 0.012 | 0.012 |
| $CeO_2$ | 0 | 0 | 0 | 0 |
| CuO | 2.80 | 2.85 | 2.85 | 2.85 |
| $F/F_2$ | 3.39 | 3.99 | 3.77 | 3.79 |
| Sum | 100 | 100 | 100 | 100 |
| $P_2O_5 + Al_2O_3$ | 59.72 | 58.95 | 59.20 | 59.21 |
| $P_2O_5/Al_2O_3$ | 18.2 | 18.4 | 18.4 | 18.6 |
| $CuO/P_2O_5$ | 0.05 | 0.05 | 0.05 | 0.05 |
| $CuO/Al_2O_3$ | 0.90 | 0.94 | 0.94 | 0.94 |
| Properties | | | | |
| $\tau(d = 0.35\ mm) >= 0.5$ [nm] | 339 | 340 | 338 | 340 |
| $\tau(d = 0.35\ mm) >= 0.8$ [nm] | 362 to 578 | 364 to 574 | 366 to 578 | 364 to 578 |
| $\tau(d = 0.35\ mm) <= 0.5$ [nm] | 640 | 636 | 640 | 638 |

(na = not analyzed)

What is claimed is:

1. A fluorophosphate glass comprising a cross-link degree of at least 68% and a composition in % by weight comprising:

| % by weight | min. | max. |
|---|---|---|
| $P_2O_5$ | 25 | 60 |
| $Al_2O_3$ | 1 | 13 |
| MgO | 1 | 10 |
| CaO | 1 | 16 |
| BaO | 1 | 26 |
| SrO | 0 | 16 |
| ZnO | 0 | 10 |
| $Li_2O$ | 0 | 13 |
| $Na_2O$ | 0 | 10 |
| $K_2O$ | 4 | 11 |
| CuO | 1 | 7 |
| $\Sigma RO$ (R = Mg, Ca, Sr, Ba) | 15 | 40 |
| $\Sigma R_2O$ (R = Li, Na, K) | 3 | 18 | wherein up to 39% by molar quantity of the $O^{2-}$ ions are replaced with F.

2. The fluorophosphate glass according to claim 1, wherein the composition in % by weight further comprises:

| % by weight | min. | max. |
|---|---|---|
| $P_2O_5$ | 25 | 42 |
| $Al_2O_3$ | 3 | 12 |
| MgO | 1 | 6 |
| CaO | 1 | 11 |
| BaO | 9 | 26 |
| SrO | 0 | 16 |
| $Li_2O$ | 2 | 10 |
| $Na_2O$ | 0 | 7 |
| $K_2O$ | 4 | 11 |
| CuO | 1 | 7 |
| $\Sigma RO$ (R = Mg, Ca, Sr, Ba) | 23 | 40 |
| $\Sigma R_2O$ (R = Li, Na, K) | 3 | 18. |

3. The fluorophosphate glass according to claim 1, wherein the composition in % by weight further comprises:

| % by weight | min. | max. |
|---|---|---|
| $P_2O_5$ | 43 | 60 |
| $Al_2O_3$ | 1 | 6 |
| MgO | 3 | 10 |
| CaO | 3 | 16 |
| BaO | 1 | 16 |
| SrO | 0 | 2 |
| $Li_2O$ | 0 | 7 |
| $Na_2O$ | 2 | 10 |
| $K_2O$ | 4 | 11 |
| CuO | 1 | 7 |
| $\Sigma RO$ (R = Mg, Ca, Sr, Ba) | 15 | 32 |
| $\Sigma R_2O$ (R = Li, Na, K) | 10 | 18. |

4. The fluorophosphate glass according to claim 1, wherein the content of CuO is lower than 3% by weight.

5. The fluorophosphate glass according to claim 1, wherein the content of CuO is at least 3% by weight.

6. The fluorophosphate glass according to claim 1, wherein the composition does not contain further colorizing oxides in addition to CuO.

7. The fluorophosphate glass according to claim 1, further comprising a coating on at least one surface.

8. The fluorophosphate glass according to claim 1, wherein the cross-link degree is at most 99%.

9. A filter glass comprising:
fluorophosphate glass comprising a cross-link degree of at least 68% and a composition in % by weight comprising:

| % by weight | min. | max. |
|---|---|---|
| $P_2O_5$ | 25 | 60 |
| $Al_2O_3$ | 1 | 13 |
| MgO | 1 | 10 |
| CaO | 1 | 16 |
| BaO | 1 | 26 |
| SrO | 0 | 16 |
| ZnO | 0 | 10 |
| $Li_2O$ | 0 | 13 |
| $Na_2O$ | 0 | 10 |
| $K_2O$ | 4 | 11 |
| CuO | 1 | 7 |
| $\Sigma RO$ (R = Mg, Ca, Sr, Ba) | 15 | 40 |
| $\Sigma R_2O$ (R = Li, Na, K) | 3 | 18 | wherein up to 39% by molar quantity of the $O^{2-}$ ions are replaced with F.

10. A method for the production of a filter glass, the method comprising the steps of:
preparing a glass melt from glass components; and
bubbling oxygen through the glass melt to provide a fluorophosphate glass comprising a cross-link degree of at least 68% and a composition in % by weight comprising:

| % by weight | min. | max. |
|---|---|---|
| $P_2O_5$ | 25 | 60 |
| $Al_2O_3$ | 1 | 13 |
| MgO | 1 | 10 |
| CaO | 1 | 16 |
| BaO | 1 | 26 |
| SrO | 0 | 16 |
| ZnO | 0 | 10 |
| $Li_2O$ | 0 | 13 |
| $Na_2O$ | 0 | 10 |
| $K_2O$ | 4 | 11 |
| CuO | 1 | 7 |
| $\Sigma RO$ (R = Mg, Ca, Sr, Ba) | 15 | 40 |
| $\Sigma R_2O$ (R = Li, Na, K) | 3 | 18 | wherein up to 39% by molar quantity of the $O^{2-}$ ions are replaced with F.

11. A fluorophosphate glass comprising a composition in % by weight of:

| % by weight | min. | max. |
|---|---|---|
| $P_2O_5$ | 25 | 60 |
| $Al_2O_3$ | 1 | 13 |
| MgO | 1 | 10 |
| CaO | 1 | 16 |
| BaO | 1 | 26 |
| SrO | 0 | 16 |
| ZnO | 0 | 10 |
| $Na_2O$ | 2 | 10 |
| $K_2O$ | 0.01 | 11 |
| CuO | 1 | 7 |
| $\Sigma RO$ (R = Mg, Ca, Sr, Ba) | 15 | 40 |
| $\Sigma R_2O$ (R = Na, K) | 3 | 18 | wherein the composition is free of lithium oxide and up to 39% by molar quantity of the $O^{2-}$ ions are replaced with F.

* * * * *